(12) United States Patent
Naito et al.

(10) Patent No.: US 9,530,569 B2
(45) Date of Patent: Dec. 27, 2016

(54) METHOD FOR MANUFACTURING SOLID ELECTROLYTIC CAPACITOR ELEMENT

(71) Applicant: SHOWA DENKO K.K., Tokyo (JP)

(72) Inventors: Kazumi Naito, Tokyo (JP); Katutoshi Tamura, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 0 days.

(21) Appl. No.: 14/403,813

(22) PCT Filed: May 23, 2013

(86) PCT No.: PCT/JP2013/064317
§ 371 (c)(1),
(2) Date: Nov. 25, 2014

(87) PCT Pub. No.: WO2013/179996
PCT Pub. Date: Dec. 5, 2013

(65) Prior Publication Data
US 2015/0187505 A1    Jul. 2, 2015

(30) Foreign Application Priority Data
May 29, 2012   (JP) .................... 2012-121978

(51) Int. Cl.
| | | |
|---|---|---|
| *H01G 9/00* | (2006.01) | |
| *H01G 9/052* | (2006.01) | |
| *H01G 9/042* | (2006.01) | |
| *H01G 9/15* | (2006.01) | |

(52) U.S. Cl.
CPC .......... *H01G 9/0036* (2013.01); *H01G 9/0029* (2013.01); *H01G 9/0425* (2013.01); *H01G 9/052* (2013.01); *H01G 9/0032* (2013.01); *H01G 9/15* (2013.01); *Y10T 29/417* (2015.01)

(58) Field of Classification Search
CPC .. H01G 9/0525; H01G 9/052; H01G 2009/05; H01G 9/0032; H01G 9/0036
See application file for complete search history.

(56) References Cited

U.S. PATENT DOCUMENTS

| 5,168,434 A  * | 12/1992 | Kobayashi ................ 361/534 |
| 2004/0182199 A1* | 9/2004 | Naito ........................... 75/245 |
| 2011/0239424 A1* | 10/2011 | Shibuya ............ H01G 9/0032 |
| | | 29/25.41 |

FOREIGN PATENT DOCUMENTS

| JP | 57-154826 A | 9/1982 |
| JP | 05-101988 A | 4/1993 |
| JP | 2001-237146 A | 8/2001 |
| JP | 2003-272959 A | 9/2003 |
| JP | 2004-349658 A | 12/2004 |
| JP | 2005-325448 A | 11/2005 |
| JP | 2008-150251 A | 7/2008 |
| WO | 2004/055843 A1 | 7/2004 |
| WO | 2005/099936 A1 | 10/2005 |

OTHER PUBLICATIONS

Jennifer McKay, "Safety Data Sheet: Bonderite S-FN Aquadag E," Ladd Research, Oct. 1, 2014.*
English machine translation of JP 05-101988.*
International Search Report for PCT/JP2013/064317 dated Aug. 13, 2013 [PCT/ISA/210].

* cited by examiner

*Primary Examiner* — Zandra Smith
*Assistant Examiner* — Evan Clinton
(74) *Attorney, Agent, or Firm* — Sughrue Mion, PLLC

(57) ABSTRACT

The present invention provides a method for manufacturing a solid electrolytic capacitor element, wherein a dielectric layer, a semiconductor layer, a carbon layer and a silver layer are sequentially formed on a tungsten base material. This method is characterized in that: the formation of the carbon layer is carried out by laminating a carbon paste on the semiconductor layer; the carbon paste is an aqueous resin solution containing carbon particles; and a repair formation treatment is carried out after the formation of the carbon layer but before the formation of the silver layer. The time duration of the repair formation treatment is 1-40 minutes; the current density is 0.05-2.5 mA/piece; and the treatment temperature is 0-40° C.

5 Claims, No Drawings

METHOD FOR MANUFACTURING SOLID ELECTROLYTIC CAPACITOR ELEMENT

CROSS REFERENCE TO RELATED APPLICATIONS

This application is a National Stage of International Application No. PCT/JP2013/064317 filed May 23, 2013, claiming priority based on Japanese Patent Application No. 2012-121978 filed May 29, 2012, the contents of all of which are incorporated herein by reference in their entirety.

TECHNICAL FIELD

The present invention relates to a method for manufacturing a solid electrolytic capacitor element comprising a tungsten base material as an anode body.

BACKGROUND ART

With the progress of small-size, high-speed and light-weight electronic devices such as cellular phones and personal computers, the capacitor used for these electronic devices is demanded to have a smaller size, a larger capacitance and a lower equivalent series resistance (ESR).

As an example of such a capacitor, an electrolytic capacitor has been proposed, which capacitor is produced by anodically oxidizing an electrode comprising a sintered body made of a valve-acting metal powder which can be anodized such as tantalum to form a dielectric layer made of the oxide of the metal on the surface of the electrode.

The electrolytic capacitor using tungsten as a valve-acting metal and employing a sintered body of the tungsten powder as an anode body can attain a larger capacitance compared to the electrolytic capacitor obtained with the same formation voltage by employing an anode body of the same volume using the tantalum powder having the same particle diameter. However, the electrolytic capacitor having the sintered body of the tungsten powder has been unpracticed as an electrolytic capacitor due to the large leakage current (LC). In order to solve this issue, a capacitor using the alloy of tungsten and other metals has been studied and has achieved some improvement in the leakage current, but it was not enough (JP-A-2004-349658 (U.S. Pat. No. 6,876,083 B2); Patent Document 1).

Patent Document 2 (JP-A-2003-272959) discloses a capacitor using an electrode of a tungsten foil having formed thereon a dielectric layer selected from $WO_3$, $W_2N$ and $WN_2$, but the capacitor is not to solve the above-mentioned leakage current problem.

Also, Patent Document 3 (WO 2004/055843 publication (U.S. Pat. No. 7,154,743 B2)) discloses an electrolytic capacitor using an anode body selected from tantalum, niobium, titanium and tungsten, but it does not describe a specific example using tungsten in the specification.

PRIOR ART

Patent Document

Patent Document 1: JP-A-2004-349658
Patent Document 2: JP-A-2003-272959
Patent Document 3: WO 2004/055843

DISCLOSURE OF THE INVENTION

Problems to be Solved by the Invention

An object of the present invention is to provide a tungsten solid electrolytic capacitor which can solve the leakage current (LC) problem in the solid electrolytic capacitor in which tungsten is used as a base material, and can be put to practical use.

Means to Solve the Problem

The present inventors have made a detailed study of a method for manufacturing a solid electrolytic capacitor element obtained by forming a dielectric layer, a semiconductor layer, a carbon layer and a silver layer in this order on a sintered body of tungsten powder.

In a solid electrolytic capacitor employing tantalum or aluminum as a base material, generally, a stable capacitor element free from leakage current can be obtained by conducting a repair formation treatment in an aqueous solution for chemical formation after forming a semiconductor layer. Accordingly, chemical formation for repair (repair formation treatment) is not conducted in a chemical formation liquid mainly comprising water after forming a carbon layer and before forming a silver layer. However, the present inventors have found that regarding a solid electrolytic capacitor using tungsten as a base material, good leakage current characteristics of the manufactured capacitor element can be attained when repair formation treatment is conducted in an aqueous solution for chemical formation after forming a carbon layer and before forming a silver layer, and have accomplished the present invention.

That is, the present invention relates to a method for manufacturing a capacitor element as described in [1] to [7] below.

[1] A method for manufacturing a solid electrolytic capacitor element comprising a dielectric layer, a semiconductor layer, a carbon layer and a silver layer sequentially formed on a tungsten base material, wherein the carbon layer is formed by laminating a carbon paste on the semiconductor layer; the carbon paste is an aqueous resin solution containing carbon particles; and a repair formation treatment is carried out after the formation of the carbon layer but before the formation of the silver layer.

[2] The method for manufacturing a capacitor element according to [1] above, wherein the time duration of the repair formation treatment is 1 to 40 minutes.

[3] The method for manufacturing a capacitor element according to [1] or [2] above, wherein the current density of the repair formation treatment is 0.05 mA/piece or more and 2.5 mA/piece or less.

[4] The method for manufacturing a capacitor element according to [1] or [2] above, wherein the temperature of the repair formation treatment is 0° C. or higher and 40° C. or lower.

[5] The method for manufacturing a capacitor element according to [1] above, wherein the time duration of the repair formation treatment is 1 minute or more and 40 minutes or less, the current density of the repair formation treatment is 0.05 mA/piece or more and 2.5 mA/piece or less and the temperature of the repair formation treatment is 0° C. or higher and 40° C. or lower.

[6] The method for manufacturing a capacitor element according to [1] above, wherein a sintered body of tungsten powder which is obtained by reducing ammonium tungstate is used as a tungsten base material.

[7] The method for manufacturing a capacitor element according to any one of [1] to [6] above, wherein the resin is at least one kind selected from a group of vinyl alcohol resin, water-soluble acrylic resin, ethylene oxide resin, carboxy vinyl resin, hydroxy cellulose resin, modified alkyd resin, water-soluble phenol resin and water-soluble amide-imide resin.

Effects of the Invention

When an electrolytic capacitor is produced using a capacitor element having an anode body made of tungsten base material obtained by a method of conducting a repair formation after forming a carbon layer according to the present invention, a capacitor having lower leakage current can be obtained, and the yield of the products having good LC characteristics can be increased.

MODE FOR CARRYING OUT THE INVENTION

In the method for manufacturing a capacitor element of the present invention, it is preferable to use a sintered body of tungsten powder as a base material (anode body). The tungsten powder to be a base material is commercially available. However, tungsten powder having a smaller particle diameter, which is more preferable as a base material, can be obtained, for example, by pulverizing tungsten trioxide powder under hydrogen atmosphere, or by reducing tungstic acid or salt thereof (such as ammonium tungstate) or tungsten halide with a reducing agent such as hydrogen and sodium, and appropriately selecting the reducing conditions.

Also, the tungsten powder can be obtained by reducing the tungsten-containing mineral directly or through several steps and by selecting the reducing conditions.

Among these, from the tungsten powder made from ammonium tungstate and prepared by using a reducing agent and selecting appropriate reducing conditions, tungsten powder having an average particle diameter as small as 0.7 µm can be manufactured easily. Further, the powder enables production of a capacitor having higher capacitance due to a smaller particle diameter than the tungsten powder having an average particle diameter of 1 µm obtained by reducing tungsten oxide with hydrogen, which is preferable.

The tungsten powder as a base material may be granulated one (hereinafter, the granulated tungsten powder may be simply referred to as the "granulated powder". Also, the ungranulated tungsten powder may be referred to as the "primary powder"). The granulated powder is preferable since it has good flowability and operability for molding and the like.

The ungranulated tungsten powders may further be the one in which the fine pore distribution is adjusted in the manner as JP-A-2003-213302 (EU Patent 1 388 870) discloses on the case of a niobium powder.

For example, the granulated powder can also be obtained by adding at least one member of the liquid such as water and liquid resin to the primary powder so as to be made into the granules having an appropriate size; and sintering the granules by heating under reduced pressure. The reduced-pressure condition for obtaining easy-to-handle granulated granule (for example, at 10 kPa or less under non-oxidizing gas atmosphere such as hydrogen) and the high temperature standing conditions (for example, at a temperature from 1,100 to 2,600° C. for 0.1 to 100 hours) can be determined by a preliminary experiment. If there are no agglomerations of the granules with each other after the sintering, there is no need for pulverization.

Such granulated powder can be classified by a sieve into particles of a similar diameter. The volume average particle size within a range of preferably 50 to 200 µm, more preferably 100 to 200 µm, is suitable because the powder can smoothly flow from the hopper of the molding machine to a mold.

The primary powder is adjusted to have a volume average primary particle diameter of preferably 0.1 to 1 µm and more preferably 0.1 to 0.3 µm can increase the capacitance of the electrolytic capacitor, particularly when the capacitor is produced from the granulated powder thereof, which is preferable.

When obtaining such a granulated powder, it is desirable to make the granulated powder so as to have a specific surface area (by BET method) of preferably 0.2 to 20 $m^2/g$, more preferably 1.5 to 20 $m^2/g$, by controlling the above-mentioned primary particle diameter because it can further increase the capacitance of the electrolytic capacitor.

The tungsten powder as a base material further containing, on a part of the surface, at least one member selected from tungsten silicide, tungsten nitride, tungsten carbide and tungsten bromide can be suitably used.

Examples of a method for silicifying a part of the particle surface of the tungsten powder include, for example, mixing the silicon powder well into the tungsten powder and allowing the mixture to react by heating under reduced pressure. In the case of using this method, the silicon powder reacts with the tungsten from the surface of the tungsten particles and tungsten silicide such as $W_5Si_3$ is formed and localized generally within 50 nm from the surface layer of the tungsten particles. Hence, the core of the primary particles remains as a highly-conducting metal, which suppresses the equal serial resistance of the anode body for a capacitor produced using the tungsten powder, which is preferable. The tungsten silicide content can be adjusted by the silicon amount to be added. The silicon content of the tungsten powder is preferably 7 mass % or less, more preferably 0.05 to 7 mass %, and particularly preferably 0.2 to 4 mass %. The tungsten powder containing silicon within the above-mentioned range is a preferable powder for use in the electrolytic capacitors, imparting good LC characteristics to the capacitors.

When the above-mentioned low-pressure condition is set to $10^{-1}$ Pa or lower, preferably $10^{-3}$ Pa or lower, the oxygen content of the tungsten powder can be configured to a range of 0.05 to 8 mass %. The reaction temperature is preferably 1,100° C. or higher and 2,600° C. or lower. The smaller the particle diameter of the silicon to be used, the silicification can be carried out at a lower temperature. However, when the reaction temperature is lower than 1,100° C., it takes time for silicification. When the reaction temperature exceeds 2,600° C., the silicon comes to evaporate easily, which will require the maintenance for the high-temperature vacuum furnace.

The time period for allowing the powder to stand at a high temperature is preferably three minutes or more and less than two hours. The optimum conditions of the temperature and period of time according to the high-temperature vacuum furnace to be used can be determined by analyzing the powder produced in the preliminary experiment.

As an example of the method for nitriding a part of the surface of tungsten powder, there is a method of placing the tungsten powder at 350 to 1,500° C. under reduced pressure (usually $10^{-3}$ Pa or less) of a nitrogen gas atmosphere for from one minute to ten hours.

Tungsten molded bodies or tungsten sintered bodies may be subjected to nitridation under the similar conditions as in the case of tungsten powder. For example, the nitridation may be performed at any stage of the primary powder, after producing the granulated powder, or after producing the sintered body. Thus, the timing of the nitridation is not specified but it is preferable to perform nitridation in an early stage of the production process. The nitridation can prevent excessive oxidation of the powder when the powder is handled in air.

As the nitridation amount, it is preferable to allow nitrogen to remain in the anode body in an amount of 0.01 to 0.5 mass %, more preferably 0.05 to 0.3 mass %. When the primary powder is nitrided, the nitridation amount of the primary powder may be adjusted to the same to twofold amount of the target nitrogen content in the anode body as a measure. That is, a preliminary test is to be performed to adjust the nitridation amount of the primary powder within a range of 0.01 to 1 mass % so as to attain the above-mentioned preferable nitrogen content as an anode body.

In the above-mentioned nitrogen content, not only the nitrogen bonded to tungsten but also the nitrogen having no chemical bond with tungsten (e.g. nitrogen forming a solid solution) is included.

As an example of the method for carbonizing a part of the surface of the tungsten powder, there is a method of placing the tungsten powder at 300 to 1,500° C. under reduced pressure (usually $10^{-3}$ Pa or less) in a high temperature vacuum furnace using carbon electrodes for from one minute to ten hours. The carbon content can be adjusted by selecting the temperature and period of time. It is preferable to perform the carbonization so as to make the carbon content of the obtained anode body to 0.001 to 0.1 mass %, more preferably to 0.01 to 0.1 mass %. The timing of the carbonization is the same as the above-mentioned timing of the nitridation. However, since carbon remains in the anode body in a high yield, the carbon content can be adjusted within the above-mentioned range whenever the carbonization is conducted. When the nitrogen gas is introduced into the furnace with carbon electrodes under predetermined conditions, the carbonization and the nitridation occur simultaneously, which enables the production of the tungsten powder in which a part of the surface is nitrided and carbonized.

As an example of the method for boronizing a part of the surface of the tungsten powder, there is a method of placing boron or a boron-containing compound as a boron source when granulating the tungsten powder. It is preferable to add the boron source so that the boron content in the obtained anode body may be preferably 0.001 to 0.1 mass %, more preferably 0.01 to 0.1 mass %. Good LC characteristics can be attained when the boron content is within the above-mentioned range. When a silicified, nitrided or carbonized powder is put into a furnace with carbon electrodes, with a boron source placed in the furnace, and is granulated, it is possible to manufacture a tungsten powder in which a part of the surface is silicified and boronized, nitrided and boronized, or carbonized and boronized. When the boronization is performed to obtain a predetermined boron content, the LC characteristics are further improved in some cases.

Thus, it is preferable to provide a process for allowing a part of the surface of the anode body to include at least one compound selected from tungsten nitride, tungsten carbide and tungsten boride at any timing during the process of manufacturing the anode body.

In the present invention, the sintered body of the tungsten power (primary powder or granulated powder) is used as a base material (anode body) of a capacitor, a dielectric layer is formed on the surface of the electrode, and a semiconductor layer is provided thereon as a counter electrode, thereby providing a tungsten capacitor element. When a polymer solid electrolytic capacitor is manufactured, the dielectric layer and the semiconductor layer are formed on the anode body in this order by chemical formation and electrolytic polymerization, respectively. The anode body on which the dielectric layer and the semiconductor layer are serially formed may be used as a capacitor element as it is. However, a conductive layer comprising a carbon layer and a silver layer serially laminated on the semiconductor layer is preferably provided to be made into a capacitor element in order to improve electrical contact with an outer lead (e.g. lead frame) drawn from the capacitor.

The present inventors have found that, regarding the solid electrolytic capacitor in which tungsten is used as a base material, the leakage current characteristic of the manufactured capacitor element is improved by conducting repair formation in an aqueous solution for chemical formation after forming the carbon layer but before forming the silver layer.

Here, the carbon layer is preferably a carbon layer comprising carbon and a hydrophilic resin. If a carbon layer comprising carbon and a water-shedding resin are used, and repair formation is conducted in an aqueous solution for chemical formation, carbon layer sheds the aqueous solution for chemical formation. Although the layer appears to be repaired, the dielectric layer near the core of the base material is not actually repaired in some cases. Even if a surfactant is added to the aqueous solution for chemical formation to conduct chemical formation, it becomes difficult to carry out a complete repair.

Such a carbon layer can be formed by laminating a carbon paste comprising a resin solution containing carbon particles on the semiconductor layer by immersing the semiconductor layer in the carbon paste, or applying the carbon paste to the semiconductor layer, each followed by drying. In the case that the shape of the base material is a sintered body having fine pores, gas generated at the time of repair formation is encouraged to be released from the face on which a lead wire for an anode is implanted, and therefore it is desirable not to form the carbon layer on the face to prevent the formed carbon layer from being broken due to the gas generation.

Examples of the carbon particles used in the present invention include the powder in which graphite and carbon black are mixed. In addition to that, conventional known carbon is used, and hydrophilic carbon is preferable. The content of the carbon particles in the carbon paste is generally within the range of 10 to 50 mass %.

Examples of the resins used for the carbon paste include hydrophilic resin such as vinyl alcohol resin, water-soluble acrylic resin, ethylene oxide resin, carboxy vinyl resin, hydroxy cellulose resin, modified alkyd resin, water-soluble phenol resin, water-soluble amide-imide resin and the derivatives thereof. Generally, the carbon paste is prepared by dissolving in water such a resin in an amount of 1 to 20 mass %, and adding a predetermined amount of carbon thereto.

The repair formation is conducted in chemical formation liquid by using a tungsten base material as an anode and a separately provided electrode as a cathode, and applying voltage.

In the present invention, conditions of chemical formation treatment (formation time, formation current density and formation temperature) are determined not to allow the carbon layer to be detached and drop in the chemical formation liquid during the repair formation treatment.

The period of time for chemical formation treatment is preferably 1 to 40 minutes, more preferably 4 to 30 minutes and still more preferably 4 to 25 minutes. The chemical formation current density is preferably 0.05 to 2.5 mA/piece, more preferably 0.1 to 2 mA/piece and still more preferably 0.1 to 1 mA/piece. The formation treatment temperature is preferably 0 to 40° C., more preferably 1 to 30° C. and still more preferably 3 to 30° C. When the period of treatment time, the current density and the temperature fall within the above ranges, respectively, detachment and dropping of the carbon layer into the chemical formation liquid can be suppressed.

The chemical formation liquid for repair formation treatment is an aqueous electrolyte solution. Examples of electrolytes include mineral acid, organic acid, various alkali and salts thereof. A preferred example is sulfuric acid. Two or more kinds of electrolytes in the chemical formation liquid may be used in combination. Water-soluble alcohols such as ethylene glycol may be added in the chemical formation liquid in an amount of 10 mass % or less in order to lower the surface tension and the like. The chemical formation treatment may further be conducted in several batches separately. In that case, several kinds of chemical formation liquids may be used.

An electrolytic capacitor is obtained by electrically connecting one or more anode bodies of the capacitor element subjected to the repair formation treatment of the present invention to the anode terminal and the conductive layer to the cathode terminal, respectively, followed by overcoating with resin.

EXAMPLES

The present invention is described below in more detail by referring to Examples and Comparative Examples, but the present invention is not limited thereto.

Example 1

0.3 mass % of commercially-available silicon powder (average particle diameter of 1 μm) was mixed well with tungsten powder having an average particle diameter of 1 μm obtained by reducing tungsten trioxide with hydrogen, and the mixture was left to stand under reduced pressure of $10^{-3}$ Pa at 1,380° C. for 30 minutes, cooled to room temperature with air being introduced gradually, and taken out. The resultant was pulverized with a hammer mill to thereby obtain granulated powder having a particle diameter range of 20 to 150 μm (volume average particle diameter of 105 μm).

The granulated powder was molded using a molding apparatus. A separately prepared tungsten wire having a diameter of 0.29 mm was implanted in the molded body at the time of molding.

The obtained molded body was left to stand under reduced pressure of $10^{-3}$ Pa at 1,520° C. for 20 minutes, cooled to room temperature with air being introduced gradually, and taken out to thereby manufacture multiple sintered bodies having a size of 1.0×1.5×4.5 mm (on which a lead wire was implanted on the 1.0×1.5 mm face, 3.5 mm of which was inserted inside the sintered body and 8 mm of which protrudes outside). A washer made of tetrafluoroethylene was inserted in the lead wire.

The sintered body was subjected to chemical formation treatment in the chemical formation liquid (0.1% sulfuric acid aqueous solution) employing the lead wire of the sintered body as an anode and an electrode separately provided in the chemical formation liquid as a cathode, and applying a 10 V voltage at room temperature (20° C.) for ten hours. By the treatment, a dielectric layer was formed on a part of the lead wire and the sintered body.

Subsequently, the sintered body was washed with water and dried. After being immersed in 20 mass % ethylenedioxythiophene ethanol solution, the sintered body was subjected to electrolytic polymerization in a separately prepared polymerization liquid (0.4 mass % of ethylenedioxythiophene and 0.6 mass % of anthraquinone sulfonic acid were fed into a mixed solvent of 30 parts by mass of water and 70 parts by mass of ethylene glycol) at 20° C. for one hour. During the electrolytic polymerization, the values of the applied voltage and current density were set to 10 V and 44 μA/piece for the first 15 minutes (0 to 15 minutes), 10 V and 82 μA/piece for the next 15 minutes (15 to 30 minutes) and 10 V and 101 μA/piece for the subsequent 30 minutes (30 to 60 minutes). The polymerization operation was repeated 6 times to form a semiconductor layer comprising conductive polymer on the dielectric layer. Then, repair formation was conducted to repair the dielectric layer of the sintered body, using the same formation liquid as in the above first formation at 6.3 V and a current density of 0.1 mA/piece for 15 minutes.

A carbon paste comprising 30 parts by mass of carbon in which natural graphite having a volume particle diameter of 4 μm and particle size distribution of 0.5 to 210 μm and 5 mass % of carbon black were mixed, and 70 parts by mass of aqueous solution in which 5 mass % of vinyl alcohol resin Exceval (registered trademark) manufactured by Kuraray Co., Ltd. was dissolved. A carbon paste was applied on the semiconductor layer of the sintered body after repair formation except the face where the lead wire was implanted, followed by drying to thereby laminate the carbon layer thereon. Subsequently, the sintered body on which the carbon layer had been laminated was subjected to repair formation treatment using the same chemical formation liquid as that of the first formation at 6.5 V of voltage, initial current density of 0.5 mA/piece at room temperature for 15 minutes. After 15 minutes, the LC value per piece of the sintered body was 1.5 μA in the chemical formation liquid. After the repair formation treatment, the sintered body was washed with water, washed with ethanol and dried. Next, 320 pieces of the solid electrolytic capacitor elements were manufactured by laminating a silver layer on the carbon layer in the usual manner. The average capacitance was 290 μF.

Comparative Example 1

320 pieces of solid electrolytic capacitor elements were manufactured in the same way as Example 1 except that the repair formation treatment was not conducted after forming the carbon layer.

Examples 2 to 11

320 pieces of solid electrolytic capacitor elements per example were manufactured in the same way as Example 1 except that the current density value, the temperature and the period of time of the repair formation treatment after forming the carbon layer were changed as in Table 1.

Example 12

A solid electrolytic capacitor element was manufactured in the same way as Example 1 except that the carbon paste was changed to the one comprising 25 parts by mass of carbon in which natural graphite having a volume average particle diameter of 2 µm and a particle size distribution of 0.2 to 150 µm, 5 mass % carbon black and 0.5 mass % nanotubes were mixed; and 75 parts by mass of an aqueous solution in which 2 mass % of hydroxy cellulose resin SE550 manufactured by Daicel Corporation was dissolved.

Example 13

The sintered body was obtained in the same way as Example 1 except that tungsten powder having a volume average particle diameter of 0.7 µm was manufactured using ammonium tungstate instead of tungsten oxide, the powder was left to stand under reduced pressure at 1,450° C. for 30 minutes, the obtained aggregated product was pulverized with a hammer mill to make a granulated powder having a particle diameter range of 30 to 180 µm (volume average particle diameter of 115 µm), and the granulated powder was sintered at 1,590° C. instead of 1,520° C. Then, solid electrolytic capacitor elements were manufactured in the same manner. The average capacitance was 380 µF.

Comparative Example 2

A solid electrolytic capacitor element was manufactured in the same way as Example 13 except that Electrodag (registered trademark) PR406 (butyl carbinol solution of water-shedding resin) manufactured by Acheson Colloids Company was used as a carbon paste.

Table 1 shows LC (µA) and average capacitance (µF) of the solid electrolytic capacitor elements manufactured by Examples 1 to 13 and Comparative Examples 1 and 2, with the conditions of repair formation treatment (current density, treatment time period and treatment temperature). The capacitance was measured by using an LCR meter manufactured by Agilent Technologies, Inc. at room temperature, 120 Hz and bias voltage of 2.5 V. The LC value was measured 30 seconds after applying a 2.5 V voltage at room temperature.

The leakage current (LC) in Table 1 is an average value of those measured after 30 seconds after applying a voltage of 2.5 V at room temperature measured between the lead wire of the solid electrolytic capacitor element as an anode and the cathode lead wire from an external power source, which was lightly brought into contact with the silver layer of the element. When there were short-circuited products and products having LC of 0.2 CVµA or more (the case where the LC field contains the "yield"), they are excluded from the LC calculation and the LC value is an average value of the products (pieces) shown in the "yield". Please note that the value of CVµA are represented by the product of the capacitance of the capacitor element, the rated voltage of 2.5 V and the LC value.

Examples 8 to 11 have a lower yield because these Examples are the cases in which either of the treatment temperature, treatment time and current density is the limit value defined in the claims, and part of the detached carbon transfers into the liquid when chemical formation after forming the carbon layer is conducted, which causes an adverse effect to the dielectric layer through the semiconductor layer in some cases. However, products counted as the yield, which have no problem in regard to performance (average capacitance), are also obtained.

The yield and the leakage current in Comparative Example 2 are lower compared to those in Example 13 because the carbon layer is formed using a carbon paste comprising carbon and water-shedding resin. This carbon layer sheds an aqueous solution for chemical formation and does not repair the dielectric layer in the base material in some cases.

Generally, when the carbon layer containing hydrophilic insulating resin is left to stand in aqueous solution, chemical formation cannot be performed since the resin is dissolved in aqueous solution. However, in the preferable predetermined conditions (Examples 1 to 7 and 12 to 13) of the present invention, the carbon layer is not to be transferred to the liquid, or if any, the transfer is within a scope which does not specifically affect to the tungsten dielectric layer. Defective products due to high leakage current such as short circuits are not found, which means the yield is high.

TABLE 1

|  | Current density (mA/piece) | Treatment time period (minute) | Treatment temperature (° C.) | LC (µA) | Average capacitance (µF) |
| --- | --- | --- | --- | --- | --- |
| Example 1 | 0.5 | 15 | Room temperature | 4 | 290 |
| Example 2 | 0.5 | 15 | 30 | 26 | 286 |
| Example 3 | 0.5 | 8 | Room temperature | 9 | 295 |
| Example 4 | 0.5 | 25 | Room temperature | 7 | 284 |
| Example 5 | 0.1 | 29 | Room temperature | 14 | 291 |
| Example 6 | 1.0 | 4 | 13 | 3 | 288 |
| Example 7 | 2.0 | 13 | 1 | 37 | 296 |
| Example 8 | 0.5 | 15 | 40 | 85 (yield: 110 pieces) | 295 |
| Example 9 | 0.5 | 40 | Room temperature | 52 (yield: 262 pieces) | 288 |
| Example 10 | 0.05 | 30 | Room temperature | 114 (yield: 42 pieces) | 298 |
| Example 11 | 2.5 | 15 | Room temperature | 139 (yield: 9 pieces) | 302 |
| Example 12 | 0.5 | 15 | Room temperature | 5 | 294 |
| Example 13 | 0.5 | 15 | Room temperature | 19 | 380 |
| Comparative Example 1 | None | None | None | Yield: 0 piece | Unmeasurable |
| Comparative Example 2 | 0.5 | 15 | Room temperature | 95 (yield: 213 pieces) | 393 |

INDUSTRIAL APPLICABILITY

An electrolytic capacitor using tungsten as a base material can be realized, and a capacitor having high capacitance can be provided while reducing material costs.

The invention claimed is:

1. A method for manufacturing a solid electrolytic capacitor element comprising a dielectric layer, a semiconductor layer, a carbon layer and a silver layer sequentially formed on a tungsten base material, wherein the tungsten base material has a W content of at least 92.3 mass %, wherein the carbon layer is formed by laminating a carbon paste on the semiconductor layer; the carbon paste is an aqueous resin solution containing carbon particles; and a repair formation treatment is carried out after the formation of the carbon layer but before the formation of the silver layer, wherein the current density of the repair formation treatment is 0.05 mA/piece or more and 2.5 mA/piece or less, and wherein the temperature of the repair formation treatment is 0° C. or higher and 40° C. or lower.

2. The method for manufacturing a capacitor element according to claim 1, wherein the time duration of the repair formation treatment is 1 to 40 minutes.

3. The method for manufacturing a capacitor element according to claim 1, wherein the time duration of the repair formation treatment is 1 minute or more and 40 minutes or less, the current density of the repair formation treatment is 0.05 mA/piece or more and 2.5 mA/piece or less and the temperature of the repair formation treatment is 0° C. or higher and 40° C. or lower.

4. The method for manufacturing a capacitor element according to claim 1, wherein a sintered body of tungsten powder which is obtained by reducing ammonium tungstate is used as a tungsten base material.

5. The method for manufacturing a capacitor element according to claim 1, wherein the resin is at least one kind selected from a group of vinyl alcohol resin, water-soluble acrylic resin, ethylene oxide resin, carboxy vinyl resin, hydroxy cellulose resin, modified alkyd resin, water-soluble phenol resin and water-soluble amide-imide resin.

* * * * *